United States Patent
Darce et al.

(10) Patent No.: US 7,774,915 B2
(45) Date of Patent: Aug. 17, 2010

(54) DUCTILE IRON PRESSURE FIT GASKET

(75) Inventors: Gerardo Darce, Heredia (CR); Randall Chinchilla, San Jose (CR)

(73) Assignee: S & B Technical Products, Inc., Fort Worth, TX (US)

( * ) Notice: Subject to any disclaimer, the term of this patent is extended or adjusted under 35 U.S.C. 154(b) by 243 days.

(21) Appl. No.: 11/803,948

(22) Filed: May 16, 2007

(65) Prior Publication Data

US 2008/0284166 A1 Nov. 20, 2008

(51) Int. Cl.
*B21D 39/03* (2006.01)

(52) U.S. Cl. .................. 29/428; 285/339; 285/374; 285/910; 285/110; 277/609; 277/611

(58) Field of Classification Search ............... 277/370, 277/609, 611, 625, 644; 285/110, 113, 307, 285/332.2, 339, 342, 343, 374, 910; 29/428, 29/469, 525
See application file for complete search history.

(56) References Cited

U.S. PATENT DOCUMENTS

| 4,522,434 | A | | 6/1985 | Webb .................... 285/112 |
| 4,834,398 | A | | 5/1989 | Guzowski et al. .......... 277/207 |
| 5,067,751 | A | * | 11/1991 | Walworth et al. .......... 285/105 |
| 5,295,697 | A | | 3/1994 | Weber et al. ............ 277/181 |
| 5,297,826 | A | * | 3/1994 | Percebois et al. ........... 285/232 |
| 5,328,178 | A | * | 7/1994 | Nies ..................... 277/438 |
| 5,335,946 | A | | 8/1994 | Dent et al. .............. 285/243 |
| 5,464,228 | A | * | 11/1995 | Weber et al. ............ 277/615 |
| 6,106,029 | A | * | 8/2000 | DeMore et al. ............ 285/322 |
| 6,237,966 | B1 | | 5/2001 | Kearns ................... 285/230 |
| 6,367,802 | B1 | * | 4/2002 | Knapp ................... 277/314 |
| 6,502,867 | B2 | * | 1/2003 | Holmes et al. ............ 285/337 |
| 6,688,652 | B2 | * | 2/2004 | Holmes et al. ............ 285/105 |
| 6,843,514 | B2 | * | 1/2005 | Rex et al. ................ 285/341 |
| 6,945,570 | B2 | * | 9/2005 | Jones ................... 285/421 |
| 6,974,160 | B2 | * | 12/2005 | Jones ................... 285/337 |
| 7,108,289 | B1 | * | 9/2006 | Holmes et al. ............ 285/104 |
| 7,125,054 | B2 | * | 10/2006 | Jones ................... 285/337 |
| 7,207,606 | B2 | * | 4/2007 | Owen et al. .............. 285/339 |
| 2004/0160055 | A1 | | 8/2004 | Newton ................ 285/21.1 |
| 2005/0194784 | A1 | * | 9/2005 | Jones et al. ............ 285/332.1 |

* cited by examiner

*Primary Examiner*—James M Hewitt
*Assistant Examiner*—Gwendolyn D Fournet
(74) *Attorney, Agent, or Firm*—Charles D. Gunter, Jr.

(57) ABSTRACT

A sealing gasket is shown for use in a ductile iron piping system to form a sealed joint between mating male and female pipe ends. A sealing gasket body is provided with a series of retainer inserts which extend outwardly from a leading nose region of the elastomeric gasket body. The mating male pipe end contacts the retainer inserts prior to contacting the remainder of the gasket body during the make up of the pipe joint. The inserts help to retain the gasket within its associated groove during high pressure field conditions. The inserts are spaced circumferentially about the gasket nose region, allowing the gasket the necessary flexibility to allow insertion within the groove provided in the female, belled pipe end.

4 Claims, 4 Drawing Sheets

DUCTILE IRON PRESSURE FIT GASKET

BACKGROUND OF THE INVENTION

A. Field of the Invention

The present invention relates generally to the field of pipe connections such as those used in the municipal water and sewer pipeline industries. More particularly, this invention relates to a sealing gasket for use in joining sections of ductile iron pipe used in such industries.

B. Description of the Prior Art

Pipes are commonly used for the conveyance of fluids under pressure, as in city water lines. They may also be used as free-flowing conduits running partly full, as in drains and sewers. Pipes for conveying water in appreciable quantities have been made of steel, cast iron, concrete, vitrified clay, and most recently, plastic including the various polyolefins and PVC.

In many applications where lengths of pipe are joined in telescoping relationship, the spigot end of one pipe is inserted into the socket end of the engaging pipe at a pipe joint or "coupling." The socket end has an opening large enough to receive the spigot end of the mating pipe. A gasket is typically present within the socket end of the pipe which is intended to prevent leakage of fluid from the joint by forming a seal between the two pipe sections. Piping systems of the above type also typically include "fittings" as that term is defined in the industry. A fitting is a term which will be familiar to those in the relevant industries and includes a piece, often curved or at an angle, as a coupling, an elbow, a valve, a Tee, etc. used for connecting lengths of pipe or as an accessory to a pipe in a piping system for conveying fluids.

One important consideration in piping systems of the above type, whether in a straight run of pipe or at a fitting, is to provide adequate sealing at the pipe joints or couplings. In the case of ductile iron pipe installations, the sealing gasket must often perform in extreme circumstances in maintaining a proper seal at the pipe joints or couplings. Whereas the allowable clearance or raceway present between a female belled plastic pipe end and a mating male plastic spigot pipe end might be on the order of 5.5 mm, the same clearance or raceway in a ductile iron pipe system might be on the order of 90 to 125 mm. This is due, at least in part, to the difference in manufacturing tolerances and techniques utilized in manufacturing the two types of pipe. Because of the difference in dimensional tolerances which are present in ductile iron pipe systems, it would be desirable to provide some type of mechanism to prevent the gasket from blowing out of the groove provided in the belled pipe end during use. The mechanism used to prevent blow-outs of this type should also be such that it does not interfere with bending of the gasket during initial insertion of the gasket into the sealing groove provided in the belled pipe end.

A need exists, accordingly, for an improved sealing gasket for ductile iron pipelines which includes special features which insure that it will not be blown out of its associated retaining groove under high pressure situations.

A need also exists for such an improved sealing gasket for ductile iron pipelines which is cost-effective, easy to manufacture and easy to use in the field and which is dependable in operation.

A need also exists for such a gasket which has incorporated into the design special retention elements designed to prevent inadvertent blow out of the gasket at very high pressure, while at the same time allowing the gasket to retain sufficient flexibility to allow it to be bent and installed within its associated retaining groove in the belled pipe end of the pipe system.

A need also exists for such a gasket having retention elements which are easily interchanged, depending upon the expected field situation in which the pipe system will be utilized as well as other external factors in the operating environment.

SUMMARY OF THE INVENTION

The present invention has as one object to provide an improved sealing gasket for insertion within an annular groove within a mouth region located adjacent an end opening of a belled end of a ductile iron pipe section which is capable of sealing the belled ductile iron pipe end to a mating male pipe having an interior surface and an exterior surface.

The preferred combination sealing and restraint system includes an annular gasket body made of a resilient elastomeric material, the annular gasket body having an inner circumferential region and an outer circumferential region. When installed within the annular groove provided in the mouth region of the belled pipe end, the outer circumferential region forms a seal with the annular groove provided in the mouth region of the belled pipe end and the inner circumferential region forms a sealing surface for a mating male pipe section. A plurality of generally wedge shaped rigid retainer inserts are removably installed within and extend outwardly from the annular gasket body along the leading nose region thereof at a predetermined spacing which extends around the circumference of the annular gasket body.

The wedge shaped rigid retainer inserts are preferably formed of a material which is of a higher durometer than that of the resilient elastomeric material used to form the annular gasket body. For example, the wedge shaped retainer inserts can be formed of a suitable plastic material such as an ABS engineered plastic. In one preferred form, the wedge shaped retainer inserts have a wedge shaped nose region and a trailing leg region which includes a flexible retainer portion. The flexible retainer region can be provided in the form of a peg shaped element. The retainer inserts are installed within suitable openings provided in the nose region of the annular gasket body by pressing the peg shaped elements into the openings. The retainer inserts can be removed from the annular gasket body by pulling the peg shaped elements outwardly from the openings provided in the gasket body, whereby alternate styles of retainer inserts can be installed within the same annular gasket body. The alternate retainer elements might have, for example, a different shape or be formed from a different material, depending upon the expected fixed conditions for the pipeline system under consideration.

In one form, the nose region of the annular gasket body is connected to a pair of diverging wing like body portions of the gasket, one of the wing like body portions forming a lip seal region when contacted by the exterior surface of the mating male ductile iron pipe in forming a pipe coupling. The retainer inserts are evenly spaced about the nose region of the gasket body and are separated by a predetermined distance to form a series of gaps, the gap spacing being sufficient to allow the gasket body to be flexed for insertion into the mouth region female ductile iron pipe.

The improved sealing gasket of the invention can be used in forming a pipe joint in a fluid piping system which includes a series of sections of ductile iron pipe, each of the pipes having a female, belled end at one extent with a mouth region adjacent an end opening thereof. The mouth region has an annular groove therein which is sized to receive a mating male pipe having an interior surface and an exterior surface. The gasket of the invention is installed within the annular groove provided within the mouth region of the female, belled pipe end.

The outer circumferential region of the gasket body forms a sealing surface for the exterior surface of the mating male ductile iron pipe in forming a pipe joint. The wedge shaped plastic retainer inserts are installed within the gasket body along the leading nose region thereof at a predetermined spacing which extends around the circumference of the annular gasket body, the spacing being sufficient to allow the gasket body to be flexed to facilitate the installation of the gasket body within the annular groove provided within the mouth opening of the belled pipe end.

The mating male pipe also has a leading nose region, and the leading nose region of the mating male pipe contacts the retainer inserts prior to contacting the remainder of the elastomeric gasket body. The retainer elements are formed of a material having a higher durometer than the elastomeric material of the gasket body, whereby the retainer elements act to prevent the gasket body from blowing out of the belled pipe end in field applications under high pressure.

Additional objects, features and advantages will be apparent in the written description which follows.

DETAILED DESCRIPTION OF THE INVENTION

Figure 1:
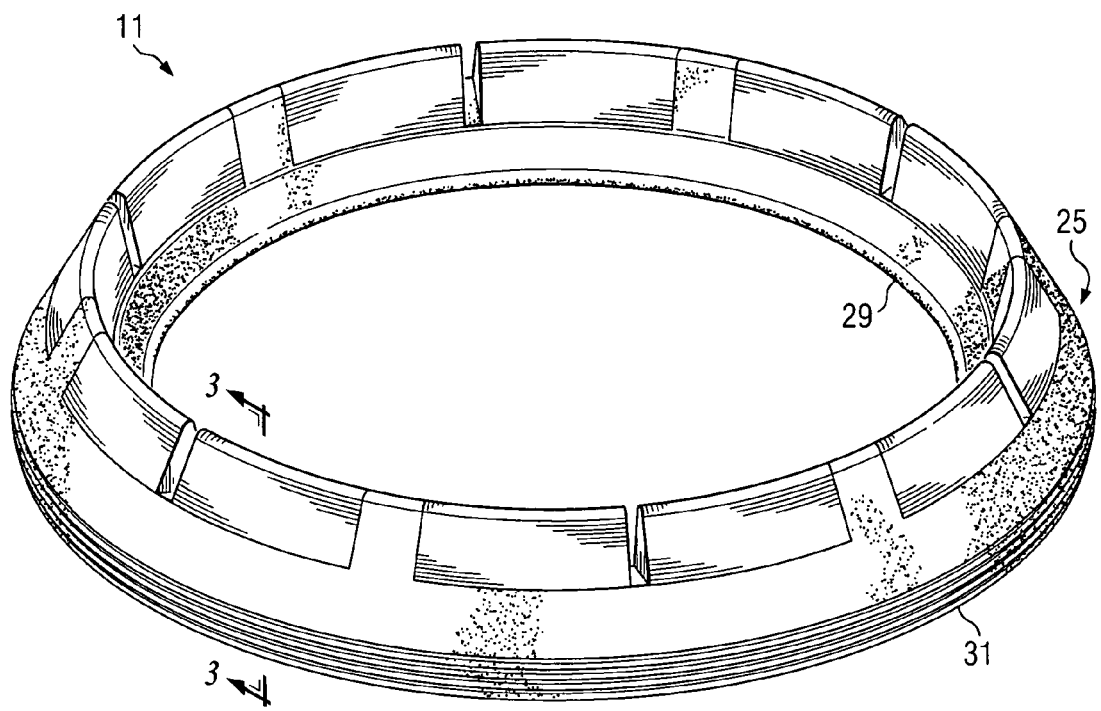
FIG. 1 is a perspective view of the improved sealing gasket of the invention showing the generally wedge shaped retainer inserts which extend outwardly from the annular gasket body at a predetermined spacing adjacent a leading nose region thereof and around the circumference of the annular gasket body.
Figure 2:
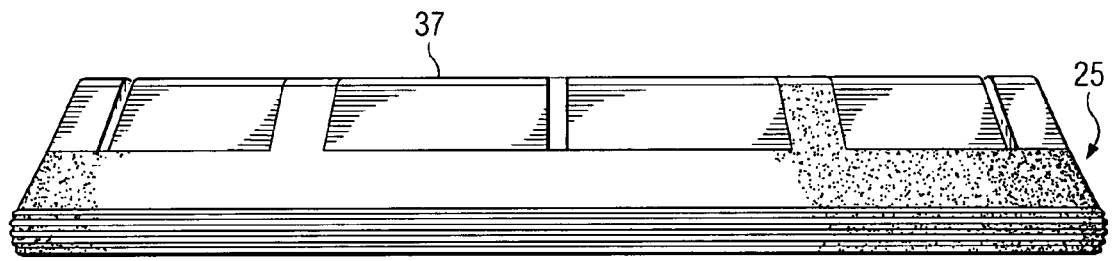
FIG. 2 is a side view of the gasket of FIG. 1.

The present invention deals with piping systems of the type used in water, sewage and other municipal fluid conveyance systems. For many years, such pipelines have traditionally been formed of a ferrous metal. By "ferrous metal" is meant iron and alloys of iron. For example, one type of ferrous metal which is commonly encountered in the water works industry is "ductile iron." This particular type of metal is widely used because it offers a combination of a wide range of high strength, wear resistance, fatigue resistance, toughness and ductility in addition to the well-known advantages of cast iron-castability, machinability, damping properties and economy of production. It takes its name from the fact that it is "ductile" in nature, rather than being brittle, as was the case with earlier cast iron products and materials. Today, grades of ductile iron are available offering the option of choosing high ductility with grades guaranteeing more than 18% elongation, or high strength, with tensile strengths exceeding 120 ksi (825 MPa). Austempered ductile iron (ADI), offers even greater mechanical properties and wear resistance, providing tensile strengths exceeding 230 ksi (1600 Mpa).

In forming a pipeline of ductile iron components, one end of each section is typically enlarged, forming a female "bell" at one end sufficient to join the next adjacent pipe section by receiving in the belled end the unenlarged or male "spigot" end of the next adjacent length of pipe within the bell end opening. The inside diameter of the bell is formed sufficiently large to receive the spigot of the next section of pipe with sufficient clearance to allow the application of an elastomeric gasket or other sealing device designed to prevent leakage at pipe joints when a plurality of pipe lengths are joined to form a pipeline.

Straight runs of ductile iron pipe of the above type have, for many years, been joined by utilizing an elastomeric gasket which is compressed between the inside walls of the bell and the outside wall of a mating spigot end of the next pipe in a series of telescoped pipes. The gasket is typically retained within the groove provided in the bell end opening of the female pipe section. However, especially in very high pressure field applications, it sometimes happens that the gasket is "blown out" of the bell.

While the improved gasket of the invention is intended to be used in ductile iron pipe systems, those skilled in the relevant arts will be familiar with other types of pipeline materials. For example, in some pipeline systems, the mating male pipe may be formed of another material, such as a suitable plastic such as PVC or a suitable polyolefin such as polyethylene. Such "hybrid" systems are becoming increasingly common in use in the rehabilitation of existing ductile iron pipe lines. However, the gasket of the invention has particular application to ductile iron pipe systems because of the problem created by the manufacturing tolerances in the casting of sections of ductile iron pipe.

As discussed briefly in the "Background of the Invention", in ductile iron pipe installations the sealing gasket must often perform in extreme circumstances in maintaining a proper seal at the pipe joints or couplings. By way of example, the allowable clearance or raceway present in the joint or coupling between a female belled plastic pipe end and a mating male plastic spigot pipe end might be on the order of 5.5 mm. However, the same clearance or raceway in the coupling of a ductile iron pipe system might be on the order of 90 to 125 mm. This is due, at least in part, to the difference in manufacturing tolerances and manufacturing techniques used in producing the two types of pipes, i.e., casting of ductile iron versus plastic extrusion.

Because of the greatly different tolerances involved in the joint or coupling of a ductile iron pipe system, it would be desirable to provide some type of mechanism to prevent the gasket from blowing out of the groove provided in the belled pipe end during use. The mechanism used to prevent blowouts of this type should also be such that it does not interfere with bending of the gasket during initial insertion of the gasket into the sealing groove provided in the belled pipe end during the gasket installation operation.

FIG. 1 shows an improved sealing gasket of the invention, designated generally as 11. As can be seen in FIGS. 5-8, the sealing gasket 11 is designed for insertion within an annular groove 13 provided within the mouth region 15 adjacent a "belled" end opening of a female ductile iron pipe 17. The gasket 11 is capable of sealing the female ductile iron pipe end to a mating male ductile iron pipe end 19 having an interior surface 21 and an exterior surface 23.

As shown in FIGS. 1-4, the annular gasket body 25 is made of an elastomeric material, such as a suitable rubber. The elastomeric material might be, for example, a suitable commercially available styrene butadiene rubber (SBR) having the desired rubber durometer. Generally, it has been found that gasket materials having durometer hardnesses less than about 40 Shore A have insufficient mass and rebound and will not provide an adequate seal for the types of sealing applications under consideration. On the other hand, it has been found, in general, that hardnesses greater than about 70 Shore A are too hard to form a proper gasket seal. Therefore, the softer material of the annular gasket body preferably has an ASTM hardness of about 40 to about 70 Shore A, and more preferably about 40 to about 60 Shore A.

The gasket body 25 has a leading nose region 27 (FIG. 3), an inner circumferential region 29, and an outer circumferential region 31 (FIG. 1). The nose region 27 of the annular gasket body is connected to a pair of diverging wing like body portions (33, 35 in FIG. 3) of the gasket. As will be appreciated with respect to FIGS. 5-8, the annular gasket is adapted to be installed within the annular groove 13 provided in the mouth region 15 of the female ductile iron pipe so that the outer circumferential region forms a seal with the female pipe mouth region and the inner circumferential region forms a sealing surface for the exterior surface 23 of the mating male ductile iron pipe 19. For the particular gasket design shown in FIG. 5, one of the wing like body portions forms a lip seal region when contacted by the exterior surface 23 of the mating male ductile iron pipe 19 in forming a pipe coupling.

A plurality of generally wedge shaped retainer inserts (i.e., inserts 37, 39 in FIG. 4) are removably installed within and extend outwardly from the annular gasket body along the leading nose region 27 thereof at a predetermined spacing which extends around the circumference of the annular gasket body. The wedge shaped retainer inserts 37, 39 are formed of a material which is "harder", i.e., of a higher durometer, than that of the resilient elastomeric material used to form the annular gasket body.

Figure 3:
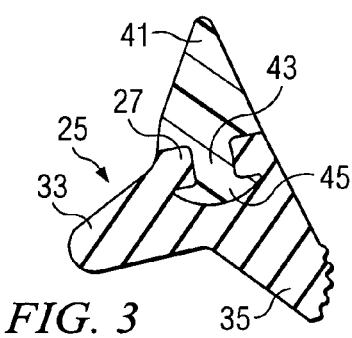
FIG. 3 is a cross-sectional view of the gasket of FIG. 1, taken generally along the lines III-III.
Figure 4:
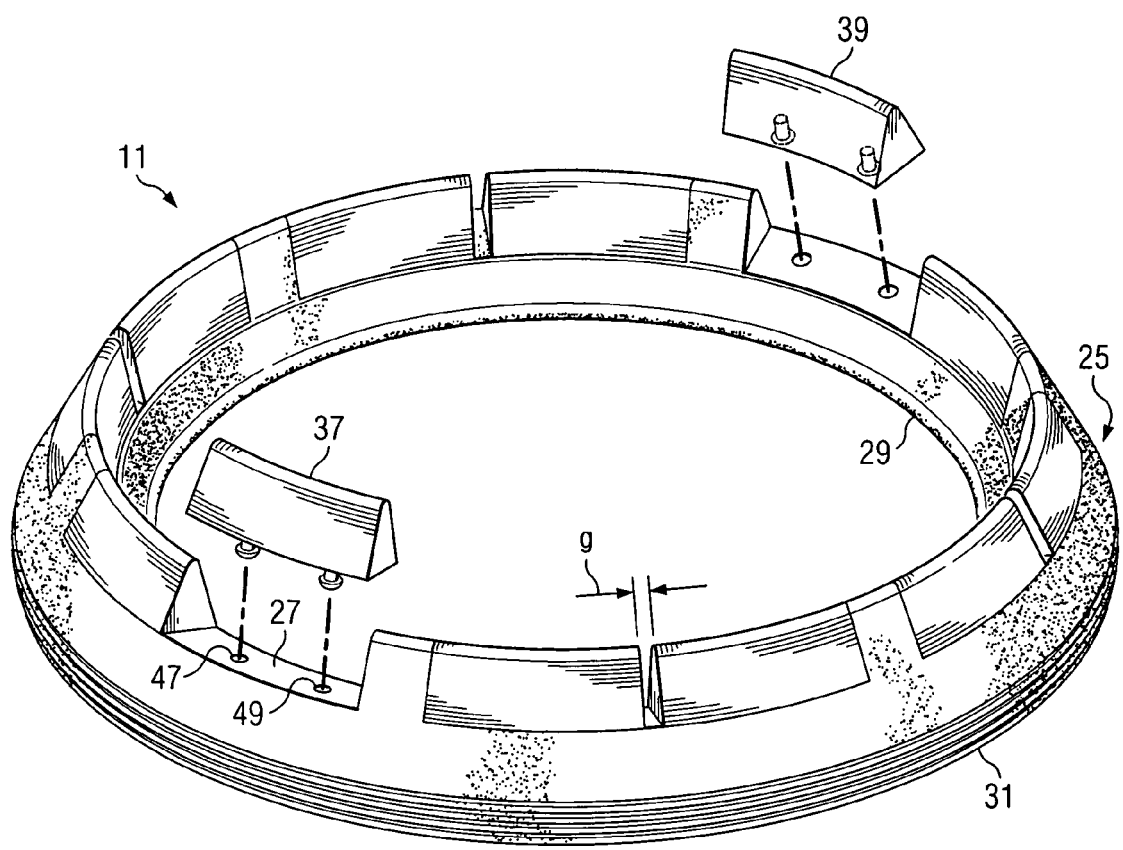
FIG. 4 is a perspective view, similar to FIG. 1, but showing the installation of two of the wedge shaped retainer inserts onto the gasket body.
Figure 5:
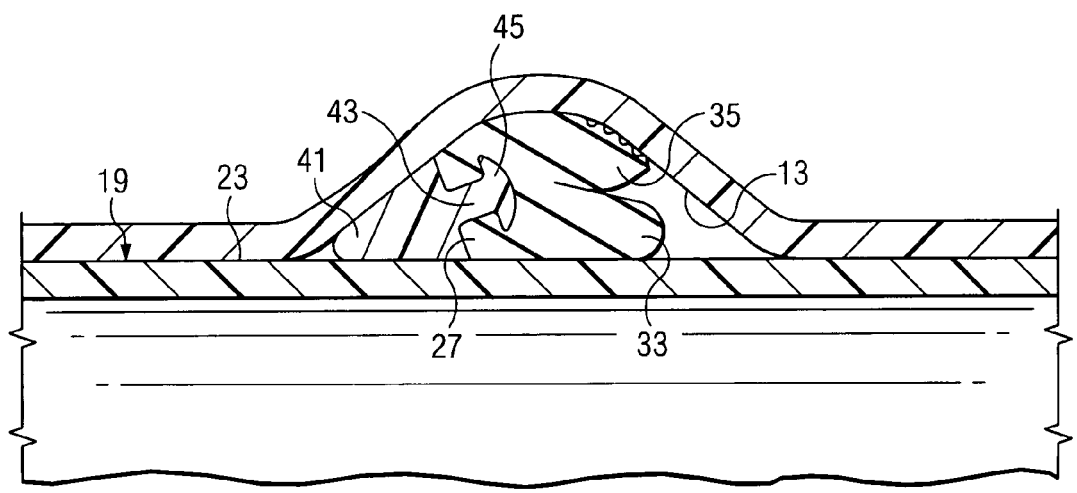
FIG. 5 is a partial, cross-sectional view of the gasket of the invention in the annular groove provided in the belled pipe end, showing the assembly of the mating male pipe end to form a sealed coupling.

The wedge shaped inserts 37, 39, as shown in FIG. 3, have a wedge shaped nose region 41 and a trailing leg region 43 which includes a flexible retainer portion 45. In the example of the inserts shown in FIGS. 5-8, the flexible retainer portion 45 of the trailing leg region of the insert is a peg shaped element. The retainer inserts are installed within suitable openings, such as openings 47, 49 in FIG. 4, provided in the nose region 27 of the annular gasket body by pressing the peg shaped elements into the openings. In similar fashion, the retainer inserts 37, 39 can be removed from the annular gasket body by pulling the peg shaped elements outwardly from the openings provided in the gasket body, whereby alternate retainer inserts can be installed within the same annular gasket body.

Because the special retainer inserts are mechanically anchored in the rubber of the gasket body, and yet are removable, alternate retainer inserts can be installed in the gasket body which are, for example, formed with a different shape. In another situation, the alternate inserts might be formed of a different type material to accommodate a particular field installation condition.

The retainer inserts 37, 39 can be installed on the gasket body in a number of convenient patterns. For example, the retainer inserts can be spaced in an evenly repeating pattern about the nose region of the gasket body (see FIGS. 1 and 4). The inserts in FIG. 4 are separated by alternating distances or gaps (such as the gap "g" in FIG. 4). The exact gap spacing can be the same in each case or vary, as shown in FIG. 4. It is only necessary that the gap spacing be sufficient to allow the gasket body to be flexed for insertion into the mouth region female ductile iron pipe during the gasket installation process. In the example shown in FIG. 4, it can be seen that the gaps "g" are filled with rubber extensions from the overall gasket body. The gaps could be made smaller with the plastic inserts being made wider, if desired. However, since the material of the inserts is generally more expensive than the material of the gasket body, this would not likely be economical.

Figure 6:
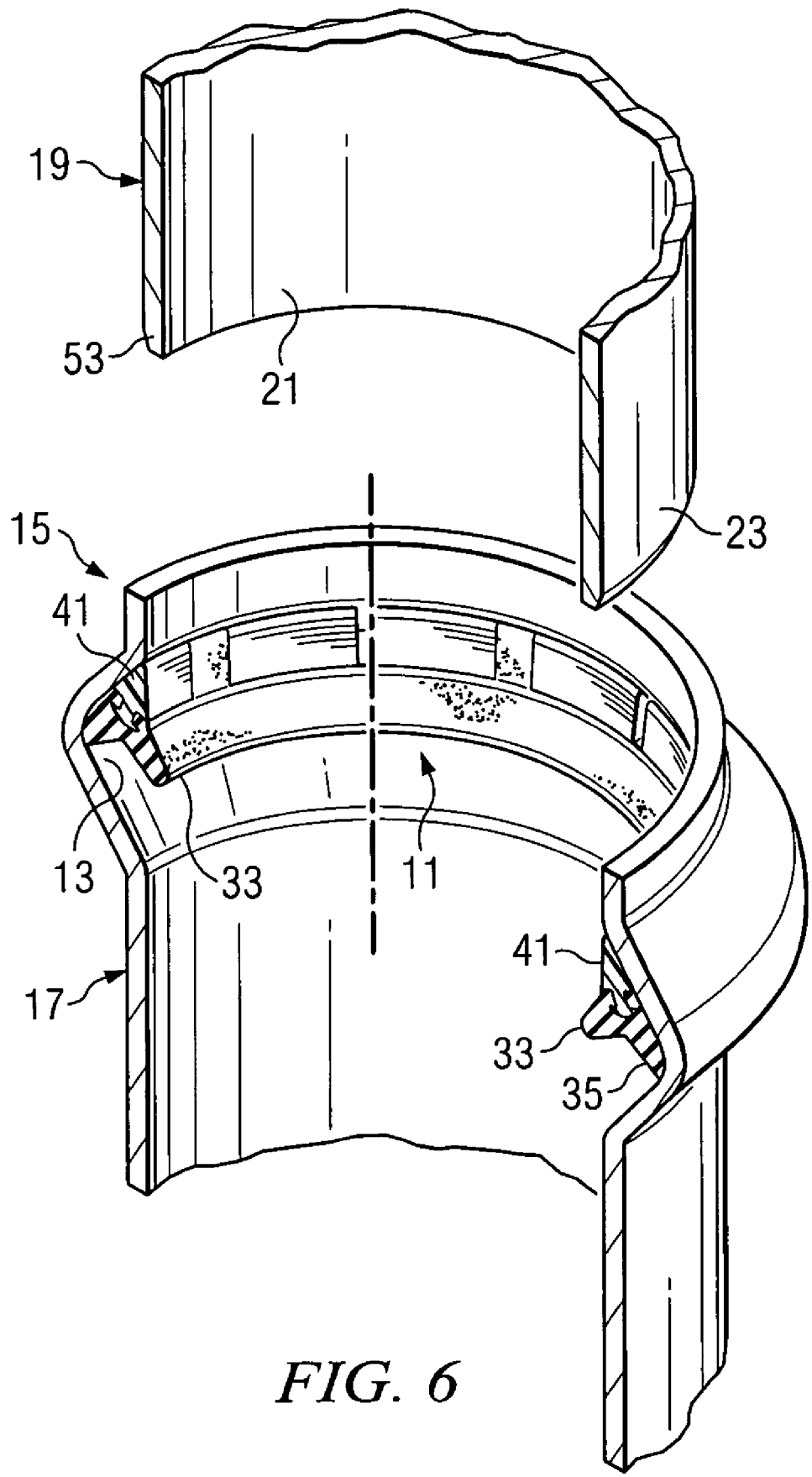
FIGS. 6-8 are simplified partial sectional views of two mating sections of ductile iron pipe showing the assembly of the male pipe end within the mating female or belled pipe end.

FIG. 6 shows the gasket of the invention 11 installed within the annular groove 13 provided in the belled end opening of the female pipe end 17. As has been stated, it is preferred to form the gasket body and inserts of suitable materials which will allow the gasket body sufficient flexibility to allow it to be "bent" to be installed within the groove 13. This can either be a hand assembly operation, or can be performed by a suitable automated assembly process. In other words, the gasket body is formed of a material which is more resilient or softer, while the plastic inserts are formed of a material which is relatively harder and less resilient. Resiliency is the capability of a strained body to recover its size and shape after deformation caused especially by compressive stress (Webster's New Collegiate Dictionary, 1976 edition, Merriam Company, Springfield, Mass.). The gasket is made from elastomeric materials.

Thus, in order to retain the necessary flexibility for the gasket body, the inserts must be made of a suitable material. Generally speaking, the relatively harder retainer inserts, should be made of a harder, relatively rigid plastic. A number of materials might meet these general characteristics. For example, polyolefins such as polypropylene or polyvinyl chloride (PVC) are two examples of suitable plastics that might find application for this purpose. For reasons which should be apparent, the harder portion should be somewhat stiff and resistant to compression. Polyethylene is regarded as less suitable for the harder portion because of its greater compressibility than polypropylene and polyvinyl. In the particular example illustrated, the preferred material for the relatively harder inserts is an acrylonitrile butadiene styrene (ABS) engineered plastic. In the example illustrated, the gasket body may be formed of a synthetic rubber having a Shore A durometer on the order of 40-65 and the plastic inserts may be formed of an ABS plastic having a Shore A durometer on the order of 75 to 95.

Figure 7:
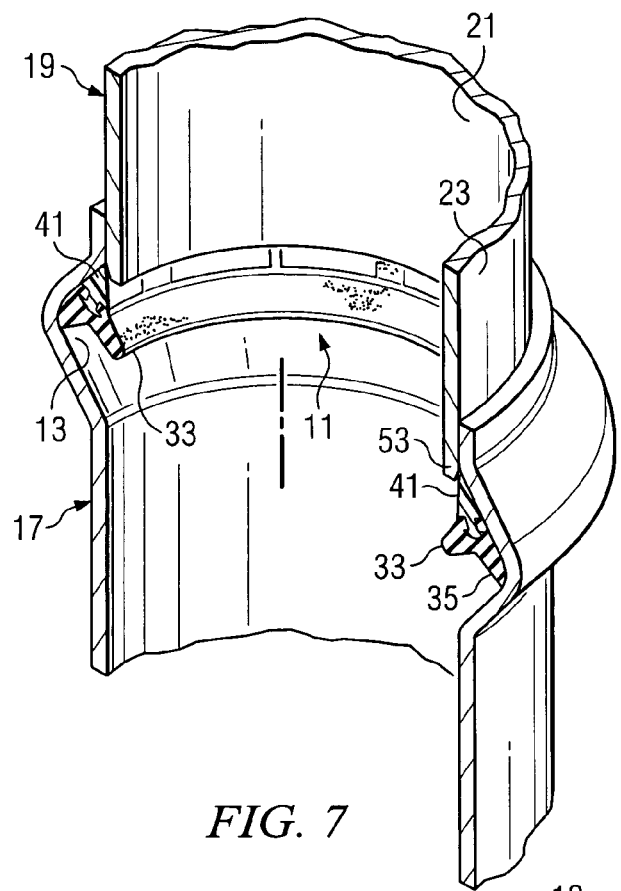
Figure 8:
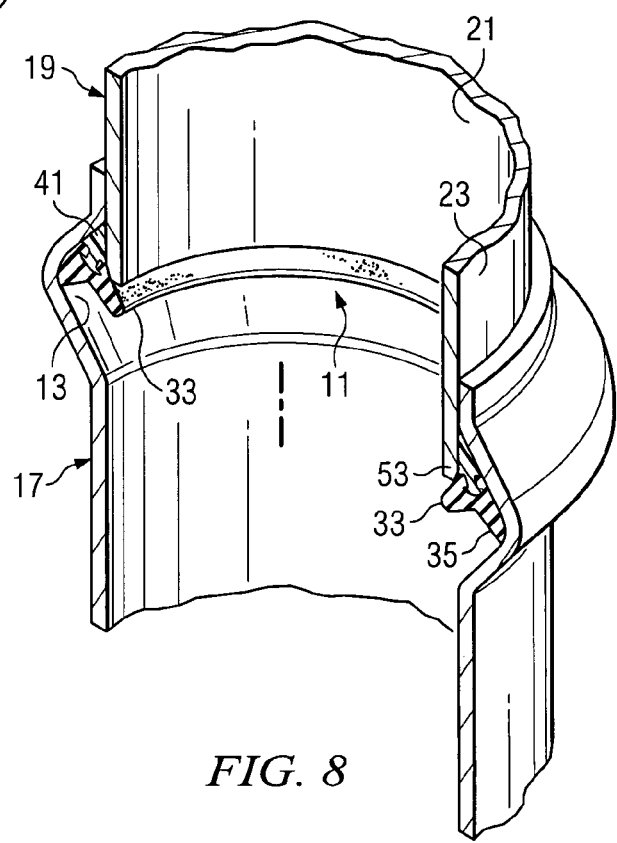

In operation, the gasket 11 of the invention is first installed within the annular groove 13, as shown in FIG. 6. FIG. 7 shows the beginning entry of the mating male pipe 19 with its leading nose region 53. As shown in FIG. 7, the nose region 53 of the male pipe first makes contact with the plastic retainer inserts 37, 39, before contacting the annular gasket body generally. As the male pipe continues to be inserted within the female belled pipe end (see FIG. 8), the nose region of the male pipe and the male pipe exterior surfaces 23 contact the "wiper region" formed by the wing portion (35 in FIG. 5) of the gasket body. When inserted into the annular groove, the gasket is bent and forced to conform to the annular groove. The rigid plastic inserts force the gasket radially outward against the pipe as the male pipe end is inserted into the female belled pipe end. Due to its resiliency, the conformed exterior surface exerts pressure on the annular groove thus keeping the gasket securely in place. The presence of the relatively hard plastic inserts helps to firmly seat the gasket and to insure that the gasket body will not be blown out of the annular groove in use in the field. When internal pressure or external forces act on the pipe joint, the gasket reacts dynamically by absorbing the internal or external load and in turn exerts more pressure on the pipe joint to preserve the integrity of the seal.

An invention has been provided with several advantages. The improved gasket of the invention is capable of joining and securely sealing a section of ductile iron pipe to an adjacent ductile iron pipe section. The system of the invention is simple in design and economical to manufacture and does not require any drastic changes in existing ductile iron components. The special retainer inserts which are present on the leading nose region of the gasket help to insure that the gasket is firmly held within the mating annular groove provided in the female belled pipe end, even in the presence of extremely high pressure situations. The plastic inserts are simply pressed into mating openings provided on the annular gasket body. As a result, the inserts can be easily installed and also easily removed. One inventory of gasket bodies can thus be used with various interchangeable inserts, depending upon particular predicted field conditions which are likely to be encountered.

While the invention has been shown in only one of its forms, it is not thus limited but is susceptible to various changes and modifications without departing from the spirit thereof.

We claim:

1. A method of forming a pipe joint, the method comprising the steps of:
   providing a fluid piping system including a series of sections of ductile iron pipe, each of the pipes having a belled end at one extent with a mouth region adjacent an end opening thereof, the mouth region having an annular groove therein, the end opening being sized to receive a mating male pipe having an interior surface and an exterior surface;
   installing a sealing gasket within the annular groove provided in the end opening of the belled pipe end, the sealing gasket having an annular gasket body made of a resilient elastomeric material having a defined durometer, the annular gasket body having an annular leading nose region at one end, and an inner circumferential region and an outer circumferential region at another end, the annular gasket body being installed within the annular groove provided in the mouth region of the ductile iron pipe so that the outer circumferential region forms a seal with the pipe belled mouth region and the inner circumferential region forms a sealing surface for the exterior surface of the mating male ductile iron pipe;
   wherein a plurality of higher durometer wedge shaped retainer inserts formed from a plastic having a relatively harder durometer than the elastomeric material of the remaining gasket body, are removably installed within and extend outwardly from the annular gasket body along the leading nose region thereof at a predetermined spacing which extends around the circumference of the annular gasket body, the spacing being sufficient to allow the gasket body to be flexed to facilitate the installation of the gasket body within the annular groove provided within the mouth opening of the belled pipe end; and
   wherein each of the wedge shaped retainer inserts has a generally wedge shaped nose portion which extends outwardly from the leading nose region of the gasket body to an apex when viewed in cross section and a trailing leg region which constitutes a flexible retainer portion for the insert, the trailing leg region having at least two peg shaped retention posts which are axially inserted into and interlocked within axially extending retainer openings in the nose region of the annular gasket body by pressing the peg shaped retention posts into the openings, whereby alternate retainer inserts can be installed within the same annular gasket body.

2. The method of claim 1, further comprising the steps of thereafter installing a mating male pipe within the end opening of the mouth region of the belled pipe end, the sealing gasket contacting the external surface of the mating male pipe in order to form a sealed connection for the pipes and form a secure joint.

3. The method of claim 2, wherein the mating male pipe has a leading nose region, and wherein the leading nose region of the mating male pipe contacts the retainer inserts prior to contacting the remainder of the elastomeric gasket body.

4. The method of claim 3, wherein the retainer inserts are formed of an acrylonitrile butadiene styrene engineered plastic material having a Shore A durometer in the range from 75 to 95, whereby the retainer elements act to prevent the gasket body from blowing out of the belled pipe end under high pressure.

* * * * *